Sept. 5, 1939.　　　　　P. J. NAGLE　　　　　2,171,592
TIRE CHAIN FOR VEHICLES
Filed Sept. 11, 1937　　　　2 Sheets-Sheet 1
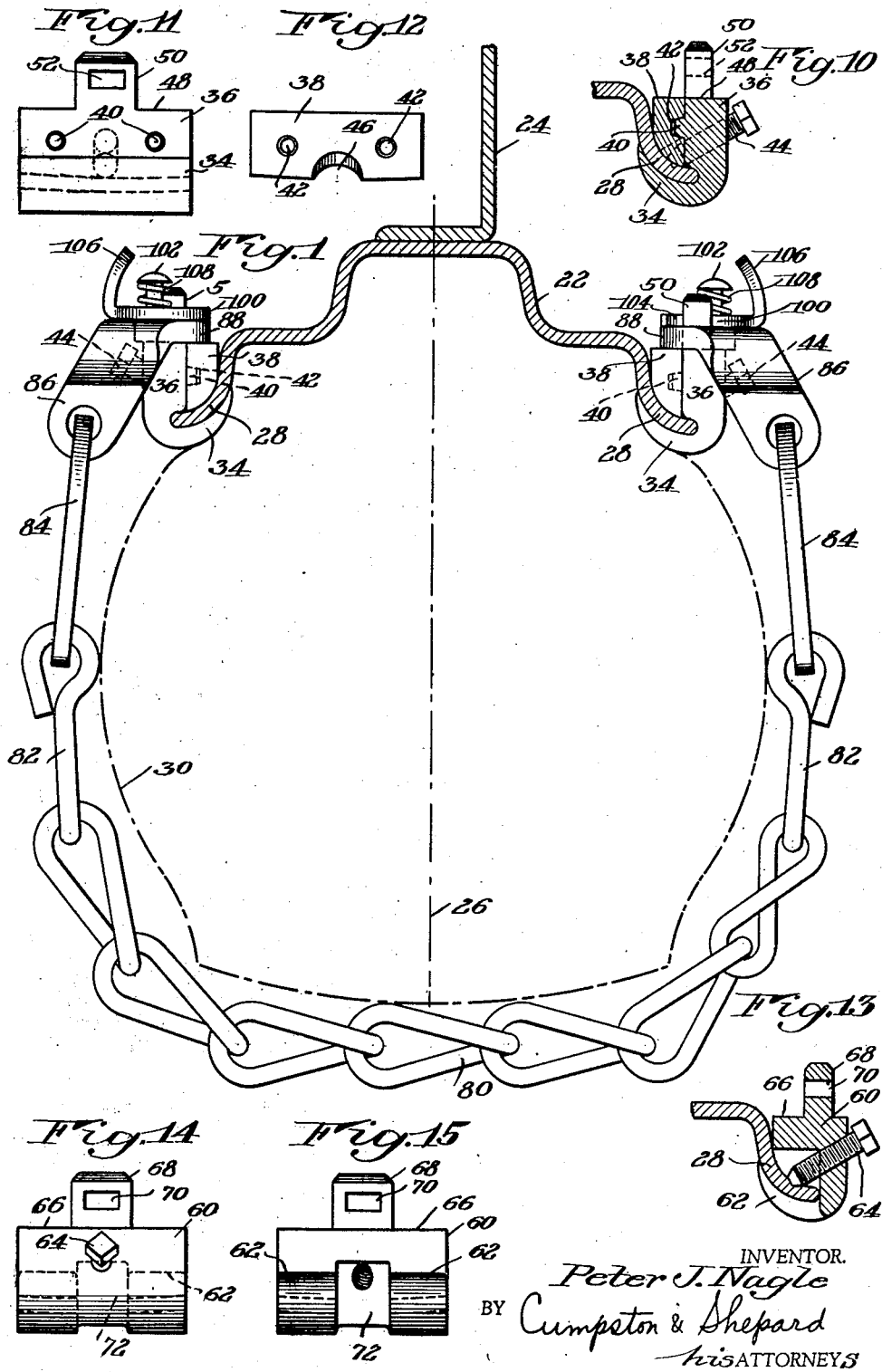

Sept. 5, 1939.  P. J. NAGLE  2,171,592
TIRE CHAIN FOR VEHICLES
Filed Sept. 11, 1937   2 Sheets-Sheet 2
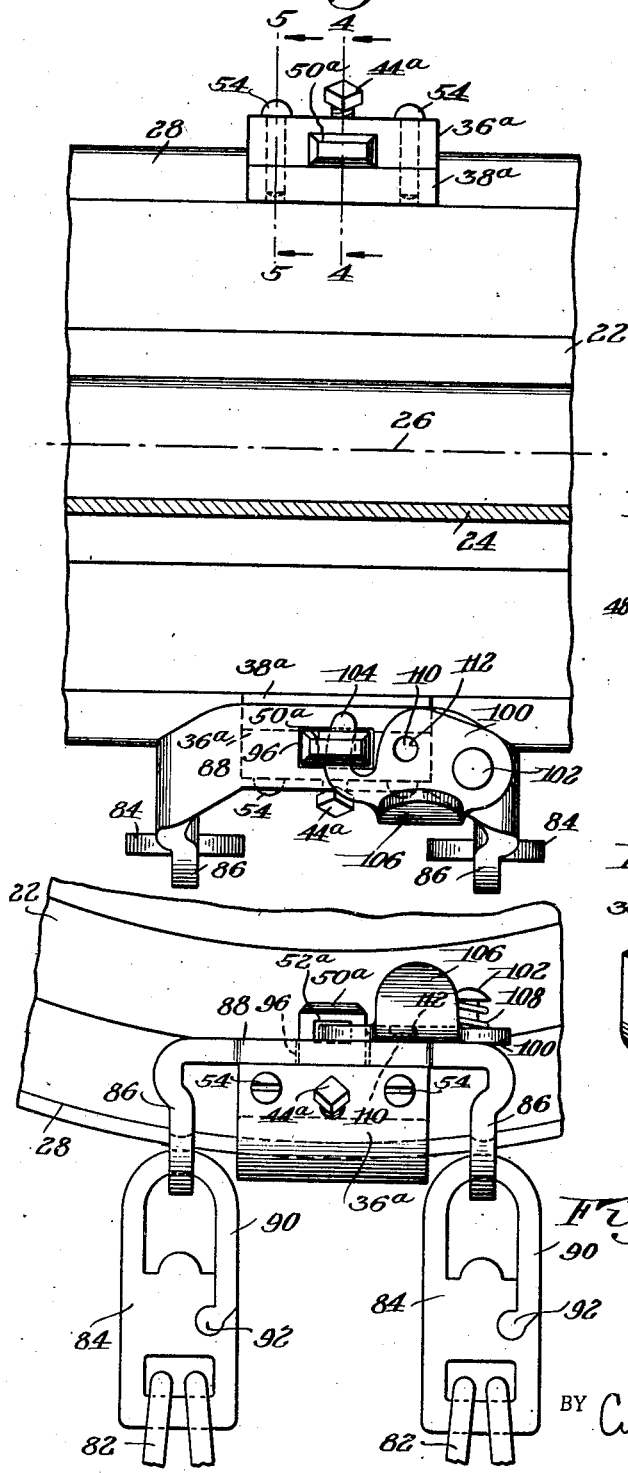
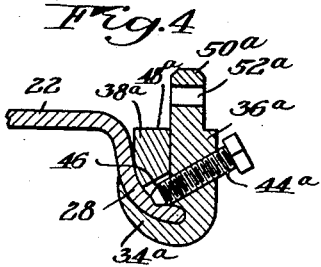
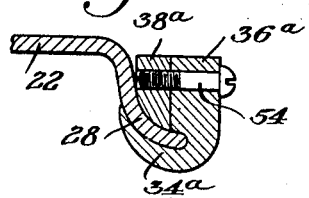
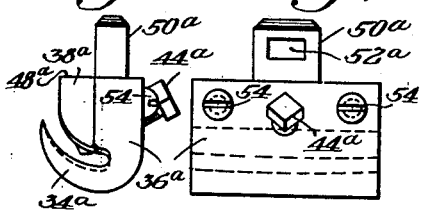
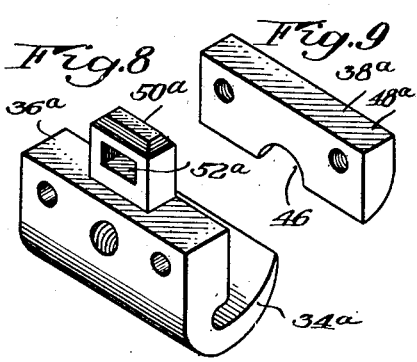
INVENTOR.
Peter J. Nagle
BY Cumpston & Shepard
his ATTORNEYS Patented Sept. 5, 1939

2,171,592

UNITED STATES PATENT OFFICE 2,171,592

TIRE CHAIN FOR VEHICLES

Peter J. Nagle, Rochester, N. Y.

Application September 11, 1937, Serial No. 163,358

8 Claims. (Cl. 152—233)

This invention has to do with tire chains or other traction increasing means for the wheels of vehicles, particularly motor vehicles such as automobiles and the like.

In the last few years there has been a tendency to dispense with what may be termed "standard" or "full" tire chains, which include chain members extending circumferentially around the vehicle wheels on opposite sides of the central plane thereof, and a series of cross chains connected to the circumferential chain members. One of the reasons for the reluctance of motorists to use these standard tire chains, is the nuisance and difficulty of applying them to the vehicle wheels, which difficulty is greatly accentuated in some of the recent models of automobiles placed on the market within the last few years, because of the fact that, in such models, the fenders or mudguards cover a much greater portion of the wheels than was formerly customary.

Although the increasing mileage of hard surfaced roads and the increasing degree to which such roads are kept clear of snow in winter by means of snow plows serve to lessen to some extent the necessity for tire chains or other traction increasing means, yet there are many instances when traction increasing devices would be of great aid to motorists and might obviate accidents. The great extent of hard surfaced roads kept clear of snow in winter has served in some respects to aggravate the tire chain problem, rather than to lessen it. For example, a motorist who has occasion to drive for a few miles along a country road with snow and ice thereon, and then to drive for a greater distance along a main highway which is kept clear of snow and ice, should have tire chains or other traction increasing means on some or all of the wheels of his automobile during travel over the slippery country road, but should remove the traction increasing means for travel over the clear main highway, since the traction increasing means might rapidly wear out on the clear pavement or might wear the tires or cause annoying noise. Before the advent of snow plows and cleared highways, the main highway would probably have had nearly as much ice and snow as the country road, and the motorist would have felt justified in taking the time and trouble to place tire chains on his automobile, before starting on his journey, if he could make the entire journey with these tire chains in place. The fact that the main highways are kept clear of snow has caused many motorists to neglect to use tire chains where they really need them on the country roads, because the motorists are reluctant to spend so much time and effort in applying the tire chains for use only for a few miles of country driving, when they know they will have to spend still more time and effort removing them as soon as they reach the main highway.

From these considerations, it is seen that there is a real need for tire chains or other traction increasing devices which can be applied and removed so easily and quickly that motorists will not be reluctant to use them even for short distances of travel. If the application and removal of the traction increasing means can be made a matter of but a few moments, without the use of tools of any kind, it is believed that many motorists who are now unwilling to use tire chains, would be induced to use them in order to obtain the additional safety afforded thereby. The present invention has, for its principal object, the provision of improved traction increasing means so simple, easy, and quick to apply and remove that this desirable result will be accomplished and that motorists will be more willing to use traction increasing means wherever road conditions make it advisable, even if for only a few miles of travel.

Another object of the invention is the provision of simplified traction increasing means so designed that they may be applied to automobile wheels of the disk type, now being currently used on many of the newer models of automobiles.

Still another object is the provision of traction increasing means of such character that no provision therefor is necessary when the wheel is initially constructed, so that it is not necessary to induce the automobile manufacturer to make special provision on his wheels for such traction increasing means.

A further object is the provision of traction increasing means which can be applied without boring holes in or otherwise damaging or altering the automobile wheels.

To these and other ends the invention resides in certain improvements and combinations of parts, all as will be hereinafter more fully described, the novel features being pointed out in the claims at the end of the specification.

In the drawings:

Fig. 1 is a cross section through a portion of the rim and other parts of a vehicle wheel, showing traction increasing means according to a preferred embodiment of the invention applied to such rim;

Fig. 2 is a fragmentary view of the wheel rim viewed from the center of the wheel looking toward the periphery, with the disk or web of the wheel in section, and showing a different embodiment of the invention applied thereto;

Fig. 3 is a side view of the parts illustrated in Fig. 2, viewed in a direction approximately parallel to the rotary axis of the wheel;

Fig. 4 is a section taken substantially on the line 4—4 of Fig. 2, illustrating in cross section a portion of the wheel rim and one of the clamping devices applied thereto;

Fig. 5 is a section taken substantially on the line 5—5 of Fig. 2, also illustrating a cross section through the clamp device and a fragment of the wheel rim;

Fig. 6 is an end view of the clamp device illustrated in Figs. 2 to 5, inclusive;

Fig. 7 is a side view of the same clamp device;

Fig. 8 is a perspective view of one part of the same clamp device;

Fig. 9 is a perspective view of a second part of the same clamp device;

Fig. 10 is a cross section through a fragment of the rim with the clamp device of the form shown in Fig. 1 applied thereto;

Fig. 11 is a face view of the inner face of one part of the clamp device shown in Fig. 10, with a second part removed therefrom;

Fig. 12 is a face view of one face of the second part of the clamp device of Figs. 1 and 10;

Fig. 13 is a view similar to Figs. 4 and 10 and showing still another form of clamp device;

Fig. 14 is an elevational view of one side of the clamp device shown in Fig. 13, and Fig. 15 is an elevational view of the opposite side thereof.

The same reference numerals throughout the several views indicate the same parts.

Referring now to the drawings there will be described by way of example a preferred embodiment of the invention. As best shown in cross section in Fig. 1, the vehicle wheel may comprise a rim of the conventional drop-center type, indicated in general at 22. If the wheel is of the disk type, the disk may be as indicated at 24, although, of course, drop-center rims of the same type may be used also with metal spokes or other forms of support.

Merely for convenience of reference, a plane passing centrally through the cross section of the rim around the entire periphery thereof may be called the central plane of the wheel, and is indicated at 26 in Figs. 1 and 2. The rotary axis of the wheel, not shown in Fig. 1, would be represented by a horizontal line somewhat above the top of the sheet of drawings on which Fig. 1 is placed. The central plane and the rotary axis will be referred to hereafter for convenience in describing the relationship of the various parts of the present construction. The plane on which the cross section of Fig. 1 is taken is a radial plane passing along the rotary axis of the wheel rim, that is, perpendicular to the central plane 26, so that Fig. 1 may be called a radial section through the rim.

As seen from Fig. 1, this drop-center rim has marginal portions or edge portions 28 which may be described as flaring outwardly in a general direction away from each other, or away from the central plane 26, and away from the rotary axis of the wheel rim. These marginal portions are concave in radial cross section, as shown, and their concave sides are toward the rotary axis of the wheel and away from the central plane 26, while their convex sides are away from the rotary axis and toward the central plane. This rim construction is not part of the present invention, but is a conventional construction now commonly used on current automobiles, and the details of the rim construction have been described merely for the purpose of enabling a better understanding of the way in which the present invention cooperates with the rim. Different drop-center wheel rims differ in minor respects from each other, but in general they have the characteristics above mentioned, and the features of the present invention may readily be modified by those skilled in the art in order to adapt the invention to such slight variations as may occur between different designs of rims.

A vehicle tire indicated diagrammatically at 30 is mounted on the rim 22. Usually this tire will be a pneumatic tire, but it is not necessarily so, for the present invention is not dependent upon the type of tire used.

The invention, generally stated, includes clamp devices to be clamped on the marginal portions or edge portions of the rim and to remain more or less permanently thereon, together with traction increasing devices which may be quickly and easily attached to or detached from those clamp devices. Two clamp devices are placed on opposite marginal edges of the rim, at points approximately directionally opposite each other, and the traction increasing devices, when attached to these clamp devices, extend partially around the cross sectional periphery of the tire and across the tread thereof, as shown in Fig. 1. As many sets of clamp devices and traction increasing devices as desired may be applied to each vehicle wheel. Three sets on each wheel are recommended, spaced approximately equally around the circumference of the wheel.

The clamp devices of the present invention are so designed that they may be placed and maintained on opposite edges of the rim entirely independently of each other. This means that no connecting bar, strap, or link is required for connecting the clamp device on one edge to the companion clamp device on the opposite edge of the rim, and in this respect, the present construction is an improvement over that disclosed in the copending United States patent application of Peter J. Nagle, Serial No. 97,437, filed August 22, 1936, and the constructions disclosed in the prior applications therein mentioned. In those prior constructions, the clamping means attached to the rim is held thereon by a bar, link, or similar means extending through the central plane of the wheel, and connecting the two clamping devices on opposite edges of the rim to each other. Such a construction is useful on many types of wheels, where there is available space through the wheel disk or between the wheel spokes for the connecting bar or link. The recent trend in automobile construction has been toward the use of disk wheels rather than spoke wheels with the disks entirely imperforate or having only such small openings therein that the connecting bars or links required in such prior constructions cannot readily be passed through such openings. Holes may be drilled through the wheel disks to accommodate the cross bars of the prior constructions mentioned, but it is highly desirable, as above stated, to avoid the necessity of drilling any holes or otherwise changing or mutilating the wheels. The clamp devices of the present construction, by eliminating the need for any cross bar or link to connect the companion clamp devices to each other, has solved the problem admirably, for the present clamp devices may be attached readily to disk wheels and all other types of wheels having suitably shaped rims, without drilling holes in or otherwise damaging the wheels.

In the preferred form of construction, illustrated in Figs. 1, 10, 11, and 12, the two clamp devices for engagement with opposite edges of the rim, both of which may be alike, each comprise a main body portion of metal for engaging and lying against the concave side of the rim margin 28, and a secondary body portion for engaging the convex side of the rim margin 28. This secondary body portion is indicated at 34, while the main body portion is in two parts, one of which is indicated at 36 and the other at 38. The secondary body portion 34 is integrally connected with the part 36 of the main body portion, as shown in Fig. 10. The part 36 has one or more projections 40 (two being preferably used, as shown) which enter one or more corresponding recesses 42 in the part 38, to hold the two parts 36 and 38 against movement with respect to each other in a direction along their meeting surfaces. The projections 40 are preferably of truncated conical shape, and the recesses 42 of corresponding shape. A set-screw 44, threaded through the part 36 of the main body portion and passing through a cut-out or notch 46 in the part 38 of the main body portion, may be screwed into engagement with the wheel rim 28, as shown in Fig. 10, to clamp the device tightly onto the rim and prevent removal therefrom. It is seen that tightening the screw 44 will draw the secondary body portion 34 tightly against the convex side of the rim margin 28, while the end of the set-screw itself may bite into the concave side of the rim margin, which firmly clamps the device in place.

In placing the clamp device on the rim, the tire is preferably pushed inwardly away from the rim at the point where the device is to be applied, which may be done by a suitable tool, assisted by partially or entirely deflating the tire in the case of pneumatic tires. The clamp device is then slipped laterally onto the edge of the rim, so that the rim enters the slot formed between the main body portion 36, 38 and the secondary body portion 34. When the body of the clamp device has been placed in proper position on the rim, the set-screw 44 is tightened to hold it in the desired position.

The purpose of making the main body portion 36, 38 in two parts is to assist in placing the device on a rim if the marginal portion of the rim is not quite of the true shape which the clamp device is intended to fit, or if the extreme outer edge of the rim is somewhat thickened with respect to the thickness of the part of the rim just inside the extreme outer edge, as sometimes happens. In such cases, the part 38 may be removed from the parts 34 and 36, and the parts 34 and 36 may first be applied to the rim and moved partially, but not entirely, to their final positions. After this, the part 38 is inserted between the rim and the part 36, and the parts are then moved onto the marginal portion of the rim to final position, and the screw 44 is tightened. The secondary portion 34 is tapered in a direction toward its free end (that is, toward the central plane 26 of the wheel) and comes down to a relatively thin fin or narrow edge, as seen in Figs. 1 and 10, so that it does not injure the tire, and so it may be readily inserted even when there is only a small space between the tire and the rim. The portion 34 may be of the same length (in a direction peripherally or circumferentially of the rim) as the main portion 36, 38, and is preferably so constructed, although it may be cut away at one or more points to make it shorter or narrower than the main portion 36, 38, or to divide it into two or more narrower portions.

The main body portion of the clamp device is provided with an approximately flat seating surface 48 facing toward the rotary axis of the wheel rim, and preferably though not necessarily lying approximately in a plane which is approximately perpendicular to a line drawn from the seating surface to the rotary axis of the wheel rim. Such seating surface may be formed entirely on the part 36, or entirely on the part 38, or on both of these parts together, which is the preferred arrangement and which is shown in the drawings. This seating surface is adapted to receive and make a seating or bearing engagement with a part of the removable and replaceable traction increasing means, as will be described below. Suitable means is provided for preventing displacement of the cooperating part of the traction increasing means from the seating surface of the clamp device. This means may include, for example, a lug on either the clamp device or the traction increasing means, entering a recess or aperture in the other one of these two members, and preferably also includes latching means cooperating with such lug to hold the parts against displacement from each other in a direction axially of the lug, while the lug itself holds the parts against displacement in a direction laterally or transversely of the lug. Preferably, but not necessarily, the lug is on the clamp device rather than on the traction increasing means. The lug, in its preferred form, is indicated at 50, and extends for a material distance or length in a direction from the seating surface 48 approximately radially inwardly toward the rotary axis of the wheel, having a free inner end, as shown, on which the traction increasing means may be impaled. This lug is preferably closely adjacent the seating surface 48; in fact, in the preferred construction, it is surrounded by the seating portion and rises from an intermediate point thereof. The lug or projection 50 preferably has a notch or recess 52 therein for cooperation with latch means on the traction increasing means, as described below. The words "recess" and "notch" as herein used are intended to be interpreted in a broad generic sense, as including cavities or openings which extend only part way through or into the member having the notch or recess, as well as cavities or openings extending all the way through and open at both ends. Preferably, but not necessarily, the notch or recess 52 extends entirely through the lug or projection 50, as shown.

A modified form of construction is illustrated in Figs. 2 to 8, inclusive, in which the clamp device is in general similar to that shown in Figs. 1, and 10 to 12, and the parts of the modified clamp device which are the same as or similar to the parts of the form first above described, are designated by the same reference numerals used for the first form described, with the addition of the letter a to each numeral. The difference between the two constructions is that in the modified form, the projections 40 and lugs 42 of the previous form are omitted and in place of them, the main body part 38a is held in immovable position with relation to the main body part 36a by means of one or more (preferably two) screws 54 passing through holes in the part 36a and screwed into threaded openings in the part 38a.

This construction, while having more parts and being somewhat more expensive than the preferred construction first described, has some advantages, when using the clamp device on a rim having a thickened edge, for the part 38a can be placed in position after the parts 34a and 36a are in their final or home positions, by sliding movement in a direction along the meeting surfaces of the parts 38a and 36a, whereas this cannot be be done in the case of the first described embodiment, because of the projections 40. In some cases, where it is anticipated that thickened edges of rims may be encountered, the portion of the rim receiving slot which is between the parts 34a, 36a may be made somewhat thicker than the portion between the parts 34a and 38a, and entrance of the thick edge of the rim into this thicker portion of the slot is easily secured by first removing the screws 54 and taking off the part 38a, later replacing it.

As before, this embodiment of the invention has a seating surface 48a formed preferably on both of the parts 36a and 38a, and a lug 50a having a notch or recess 52a therein.

Still another form of construction of the clamp device is illustrated in Figs. 13, 14, and 15. Here, the main body portion is not divided into two parts, but is formed of a single integral piece 60, the secondary body portion 62 being attached integrally thereto. The set-screw 64 is threaded through the main body portion 60 and operates in the same way as the screw 44, to hold the clamp device tightly on the rim. As before, this clamp device preferably has a seating portion 66 faced inwardly toward the rotary axis of the wheel, and preferably also a lug 68 with a notch or recess 70 therein. This modified construction of Figs. 13, 14, and 15 illustrates not only the possibility of making the body of the clamp device in one piece instead of two pieces, but also the possibility of sub-dividing the secondary body portion 62 by a notch or cut away portion 72 (Fig. 15) so that the portion 62 is in two parts, spaced from each other in a direction peripherally or circumferentially of the wheel, but both integrally attached to the main body portion 60.

These clamp devices, of any of the forms above described or of such modifications therein as those skilled in the art may readily make for the purpose of fitting different or special forms of wheel rims, may be applied to and taken off of the wheel rims whenever desired. They are intended, however, preferably to be applied once to the wheel rims and then to remain more or less permanently thereon, either throughout the winter season when snow and ice are likely to be encountered, or preferably throughout the entire year and from year to year. The clamp devices form anchoring means to which the traction increasing devices may be detachably secured in a quick and easy manner, so that it is but the work of an instant to anchor the traction increasing devices to the clamp devices, whenever use of the traction increasing devices is advisable, and again the work of but an instant to remove the traction increasing devices from the clamp devices when use of the traction increasing devices is no longer advisable. By thus providing clamp means or anchoring means more or less permanently on the wheel rim, and by providing a quick and easy means of attaching the traction increasing devices thereto and removing them therefrom, the present invention greatly encourages the motorists to employ their traction increasing devices whenever safety would be promoted thereby, even for short distances of travel.

The traction increasing means or devices include members extending around part of the cross sectional periphery of the tire and across the tread thereof, which members may be of any known or suitable form, the exact form thereof being no part of the present invention. For example, these cross members or tread members may be in the form of reinforced rubber strips, or in the well known form of chain links as indicated at 80 in Fig 1. One or more cross members or tread members may be connected to each associated pair of clamp devices, two such tread members being associated with each pair of clamp devices in the specific example herein described as an illustrative embodiment of the invention.

In this illustrative embodiment, the end links 82 of the cross chain 80 are hooked into hangar links 84, which in turn are linked with eyes in offset ends 86 of a side bar or mounting bar 88, the ends 86 being approximately parallel to each other and approximately perpendicular to the main length of the bar 88, as shown in Fig. 3, and being offset laterally from the center line of the bar, as shown in Figs. 1 and 2.

The bar 88 and ends 86 thereof are preferably all formed integrally from a single piece of metal, with the eyes in the ends punched or drilled therein. In order to hook the hangar links 84 into these eyes, the inner ends of the hangar links (that is, the ends closest to the rotary axis of the wheel when the chains are in place on the wheel) are preferably made with a strip 90 one end of which is integral with the main body portion of the link 84 and which is bent around to form a loop extending through the eye of the mounting bar end 86. The other end of the strip 90 has an enlargement 92 entering a correspondingly shaped recess in the main body portion of the link 84, the recess being undercut or of somewhat key-hole shape and closely embracing the enlargement 92 so that this end of the strip 90 cannot be pulled out of the body 84 by any reasonable degree of force.

The mounting bar 88 preferably has a seating surface for seating engagement with and bearing against the seating surface 48, 48a, or 66 of the clamp device with which it is associated. In the preferred form here shown, that surface of the mounting bar 88 which lies against the seating surface of the clamp device has an approximately flat surface having a bearing area of substantial size against the clamp device. When the lug or projection for holding the mounting bar against lateral displacement from the seating surface of the clamp device is mounted on the clamp device rather than on the mounting bar, then the mounting bars is provided with a notch or recess arranged to receive the projection, so that the mounting bar extends partially or completely around the lug or projection on the clamp device, and is restrained thereby against lateral displacement. In the preferred form here shown, this notch or recess takes the form of an aperture 96 arranged approximately midway of the mounting bar 88, and extending entirely therethrough from top to bottom, so that the mounting bar may be impaled on the lug 50, 50a, or 68, by aligning the aperture 96 with the lug, and then moving the mounting bar radially outwardly with respect to the wheel, onto the free end of the lug and down onto the seating surface of the clamp device.

To latch the mounting bar 88 on the clamp device to prevent accidental removal therefrom by movement in a direction radially inwardly toward the rotary axis of the wheel, there is provided suitable latching means mounted on the bar 88 for cooperation with the notch or recess 52, 52a, or 70 in the lug. This latching means may comprise a movable latch member 100 pivoted to the mounting bar 88 by means of a stud 102, and having an arcuate end 104 for entering the notch or recess 52, 52a, etc., when the latch is moved to effective or latching position. A finger piece 106 on the latch 100 permits easy manipulation thereof. The stud 102 is considerably longer than the thickness of the latch, and a coiled spring 108 surrounding the stud and inserted between the latch and the head of the stud, constantly presses the latch down against the inner surface of the mounting bar 88 (that is, the top surface thereof when viewed as in Fig. 2) and thus tends to hold the latch 100 frictionally in any position to which it is set. The holding of the latch in effective latching position is assisted by means of a small projection or bumped up spot 110 on the mounting bar 88 which enters a hole 112 in the latch 100 when the latch is in effective latching position, so that considerable manual force must be applied to the finger piece 106 to release the edge of the hole 112 from the bump or projection 110, when it is desired to move the latch to an ineffective or unlatched position. This prevents accidental opening of the latch and accidental loss of the tire chains or other traction increasing means.

It is seen that when the tread members or traction increasing means are in use, any pull produced on these members by conditions of use, which tends to pull them radially off of the wheel, will simply pull the mounting bars 88 radially outwardly against the inwardly faced seating surfaces on the clamp devices. The clamp devices are thus well adapted to withstand all reasonable stresses which may be produced in normal use. The lug or projection 50, 50a, etc., is of rugged and sturdy construction, easily resisting any forces which may tend to displace the mounting bar 88 in one direction or another along the seating surface of the clamp device; that is, either in a direction circumferentially of the wheel, or in a direction transverse to the central plane 26 of the wheel. In no case does any substantial stress produced by normal use of the device fall upon the latch member 100, so that this latch member need not be particularly large or strong, and the small convenient latch member here illustrated is amply sufficient to prevent such accidental movement of the mounting bar 88 as may tend to occur in a direction radially inwardly, off of the lug 50.

It is also noted that the seating surfaces of the clamp devices lie on the concave sides of the rim marginal portions 28, and somewhat radially inwardly from the extreme outer edges of these rim portions. Those forces pulling outwardly on the tire chain, in a direcetion away from the center of the wheel, will have a tendency to place the main body portion of the clamp device in compression rather than in tension, and to press it more firmly against the rim, and such outward force applied to the seating surfaces of the clamp devices may even have the effect of causing the ends of the set-screws to dig more firmly into the wheel rim, depending on the exact angle at which the forces operate. By arranging the parts so that there is a tendency to put the main body of the clamp device in compression rather than in tension, a stronger and more durable construction results.

It is further noted that the clamp devices lie relatively for out in a radial direction from the innermost edge or bottom of the rim 22, and even the innermost ends of the lugs 50, 50a, etc., lie farther from the rotary axis of the rim than the inner edge or bottom of the rim, in the preferred construction. From this it follows that ample clearance space is provided for slipping the bars 88 easily onto and off of the ends of the lugs 50, 50a, etc., notwithstanding the presence of an oversized brake drum on the wheel, or the presence of a splash ring of relatively large diameter alongside the wheel. The brake drum and splash ring are practically never of greater diameter than the diameter of the bottom or innermost edge of the rim, so that by placing all parts of the clamp devices relatively for out at the marginal edges of the rim, all parts are far enough away from the rotary axis to permit the tire chains to be easily slipped on and off of the lugs 50, 50a, etc.

The idea of sub-dividing the secondary body portion of the clamp device into two or more parts as by means of one or more recesses or cutout portions 72 (Fig. 15) is applicable not only to a clamp device in which the main body is made in one piece, but also to clamp devices in which the main body portions are made of two or more parts, such as the clamp devices of the first two forms above described.

Whenever desired, two or more set-screws may be employed for each clamp device, instead of one. No matter how many set-screws are employed, one or more of them may, if desired, press against a plug or other member interposed between the end of the set-screw and the wheel rim, instead of pressing directly against the wheel rim.

While certain embodiments of the invention have been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. A construction for application to a tire-receiving wheel rim having two outwardly extending opposite marginal edge portions, said construction including two clamp devices, one secured to each of said two edge portions of said rim independently of each other, each clamp device extending laterally around the edge of the rim and including a part for engaging the inner surface of the rim edge portion on which it is mounted, a part for engaging the outer surface of said rim edge portion, and screw threaded means on one of said parts for drawing the other of said parts firmly into contact with said rim edge portion to hold said clamp device firmly on said edge portion, traction increasing means for extending across the tread of a tire mounted on said wheel rim, means for detachably securing one end of said traction increasing means to one of said clamp devices, and means for detachably securing the other end of said traction increasing means to the other of said clamp devices.

2. A construction for application to a tire-receiving wheel rim having two outwardly extending opposite marginal edge portions, said construction including two clamp devices, one secured to each of said two edge portions of said rim independently of each other, each clamp device including a part for engaging the inner surface of the rim edge portion on which it is mounted, a part for engaging the outer surface of said rim edge portion, screw threaded means on one of said parts for drawing the other of said parts firmly into contact with said rim edge portion to hold said clamp device firmly on said edge portion, and a projection extending from one of said clamp parts in a general direction radially inwardly toward the axis of rotation of said wheel rim and having a free inner end, traction increasing means for extending across the tread of a tire mounted on said wheel rim, two apertured members, one connected to each of two opposite ends of said traction increasing means, each apertured member being arranged to be impaled on one of said inwardly extending projections by movement approximately radially outwardly onto the free end thereof, and means for releasably latching each of said apertured members to the projection on which it is impaled, to prevent accidental displacement therefrom.

3. A construction for application to a tire-receiving wheel rim having two outwardly extending opposite marginal edge portions, said construction including two clamp devices, one secured to each of said two edge portions of said rim independently of each other, each clamp device including a part for engaging the inner surface of the rim edge portion on which it is mounted, a part for engaging the outer surface of said rim edge portion, and screw threaded means on one of said parts for drawing the other of said parts firmly into contact with said rim edge portion to hold said clamp device firmly on said edge portion, each clamp device having an approximately flat seating surface of substantial area arranged approximately perpendicular to a line drawn from such clamp device radially inwardly toward the axis of rotation of said wheel rim, said seating surface being faced inwardly toward said axis, traction increasing means for extending across the tread of a tire mounted on said wheel rim, and means for detachably securing said traction increasing means to both of said clamp devices, said securing means including two members having approximately flat surfaces for overlying and seating against said seating surfaces of said two clamp devices and having a substantial bearing thereon to resist forces tending to pull said traction increasing means radially outwardly away from said tire.

4. A construction for application to a tire-receiving wheel rim having two outwardly extending opposite marginal edge portions, said construction including two clamp devices, one secured to each of said two edge portions of said rim independently of each other, each clamp device including a part for engaging the inner surface of the rim edge portion on which it is mounted, a part for engaging the outer surface of said rim edge portion, and screw threaded means on one of said parts for drawing the other of said parts firmly into contact with said rim edge portion to hold said clamp device firmly on said edge portion, each clamp device having an approximately flat seating surface of substantial area arranged approximately perpendicular to a line drawn from such clamp device radially inwardly toward the axis of rotation of said wheel rim, said seating surface being faced inwardly toward said axis, and a lug close to said seating surface and projecting approximately radially inwardly to a substantial distance beyond the approximate plane of said seating surface, traction increasing means for extending across the tread of a tire mounted on said wheel rim, and means seating on said seating surfaces and extending at least partially around said lugs thereon for detachably securing said traction increasing means to both of said clamp devices.

5. A construction for application to a tire-receiving wheel rim having two outwardly extending opposite marginal edge portions, said construction including two clamp devices, one secured to each of said two edge portions of said rim independently of each other, each clamp device including a part for engaging the inner surface of the rim edge portion on which it is mounted, a part for engaging the outer surface of said rim edge portion, and screw threaded means on one of said parts for drawing the other of said parts firmly into contact with said rim edge portion to hold said clamp device firmly on said edge portion, each clamp device having an approximately flat seating surface of substantial area arranged approximately perpendicular to a line drawn from such clamp device radially inwardly toward the axis of rotation of said wheel rim, said seating surface being faced inwardly toward said axis, and a lug close to said seating surface and projecting approximately radially inwardly to a substantial distance beyond the approximate plane of said seating surface, said lug having a recess therein, traction increasing means for extending across the tread of a tire mounted on said wheel rim, and means including two apertured members each seated on one of said seating surfaces and impaled on said lug thereof and having movable latch means for entering said recess for detachably securing said traction increasing means to both of said clamp devices.

6. As a new article of manufacture, a clamp device for application to the marginal edge portion of a tire-receiving wheel rim, to form anchoring means to which traction increasing means may be detachably secured, said clamp device including metallic body means having a slot shaped to conform approximately to the radial cross-sectional shape of said marginal edge portion of said rim, said slot being open at one side so that said clamp device may be applied laterally onto said marginal edge portion with said portion entering said slot, and set screw means carried by said body means for securing said body means against displacement from said marginal edge portion when it is received in said slot, said body means including a lug extending in a direction radially inwardly toward the axis of rotation of said wheel rim so that a part of said traction increasing means may be impaled upon said lug.

7. As a new article of manufacture, a clamp device for application to a tire-receiving wheel rim having a marginal portion curved in cross section with a concave side away from a tire mounted on the rim and a convex side toward said tire, to form anchoring means to which traction increasing means may be detachably secured, said clamp device including body means having a main portion lying, when the clamp device is applied to such a rim, on said concave side of said marginal portion of the rim and shaped to conform approximately to said concave side, a secondary portion lying on said convex side of said marginal portion and connected to said main portion beyond the outer edge of the rim, said secondary portion being tapered in a direction from said outer edge of the rim inwardly toward the center thereof, said main portion having an approximately flat surface lying radially inwardly from said outer edge of the rim and arranged approximately perpendicularly to a line drawn from said surface to the rotary axis of the rim faced toward said axis and providing a seating surface against which a part of said traction increasing means may be seated, said main portion of said body means also having a lug extending from a point adjacent said seating surface in a general direction toward said axis, to coact with said part of said traction increasing means to hold said means in place on said surface, and clamping means on said main portion of said body means for engaging said marginal portion of said rim to hold said body means against displacement from said rim when it is applied thereto.

8. A construction for application to a tire-receiving wheel rim having two opposite marginal edge portions, said construction including two holding devices, one secured to each of said two edge portions independently of the other device, each of said holding devices including two portions spaced from each other to provide between them a slot open at one end and of a size to receive one of said marginal edge portions of said rim so that each holding device may be placed on said rim with the marginal edge portion thereof in said slot, each of said holding devices further including a projection extending in a general direction inwardly toward the axis of rotation of said wheel rim and a seating surface faced inwardly toward said axis, tire chain means extending transversely across the tread of a tire mounted on said rim, mounting means secured to one end of said chain means and removably seated on said seating surface of one of said holding devices and cooperating with said projection thereof to resist displacement from said seating surface, and other mounting means secured to the other end of said chain means and removably seated on said seating surface of the other of said holding devices and cooperating with said projection thereof to resist displacement therefrom.

PETER J. NAGLE.